UNITED STATES PATENT OFFICE.

CHARLES F. SECOR, OF SAN FRANCISCO, CALIFORNIA.

IMPROVEMENT IN COMPOSITION FLUXES.

Specification forming part of Letters Patent No. 189,271, dated April 3, 1877; application filed September 26, 1876.

*To all whom it may concern:*

Be it known that I, CHARLES F. SECOR, of the city and county of San Francisco, and State of California, have invented an Improvement in Composition Flux for the reduction of gold, gold and silver, and silver ores, by smelting; and I do hereby declare the following to be a full, clear, and exact description thereof, reference being had to the accompanying drawings.

My invention relates to certain improvements in fluxes for the reduction of gold, gold and silver, and silver ores, by smelting.

This invention is for treating certain minerals or ores containing gold, gold and silver, or silver-bearing quartz, &c., in such a manner that the quartz or other silicious or earthy ferruginous minerals are fused so as to form a vitreous slag from which the gold and silver, from its density, is precipitated to the bottom of the slag.

The materials I use or submit to this treatment may be quartz or silicious earthy ferruginous minerals, also limestone, calcareous clay and other earthy matters, oxide of iron, either or all of which may contain gold, gold and silver, or silver.

I reduce the said materials to a size that will pass through a sieve of two or more holes to the linear inch—that is, if such materials are to be wrought in a reverberatory furnace; but if in a blast-furnace I do not reduce the material so small.

I will now describe the manner of performing the operation: The minerals being selected for treatment and reduced to a proper size, I mix with them some alkali, such alkali deposits or alkaline earths as are found in the great Pacific basin and surroundings, it being found combined, impregnated in the waters of various lakes, so strong and in such quantities as to be easily secured by the evaporation of such waters. It is also easily collected in the summer time or dry season, on account of its being then found on the surface of the earth, or sometimes, in different locations, in deposits. The alkali as described above generally contains chloride of sodium, sulphate and carbonate of soda, sulphate of magnesia. These usually form the constituent parts of the alkali; but they vary somewhat in different locations and, therefore, have to be used according to the principal active parts present necessary for the treatment of the material or ore. I also use caustic lime or carbonate of lime, ashes of burnt wood, powdered charcoal, and fluor-spar, cryolite or other fluorides, fluoride of calcium, artificially-formed niter, petroleum or naphtha earths.

These fluxes are used in combination, more or less, and adapted to the various kinds of ore presented, with its characteristics as ascertained by analysis.

The hard quartz holding gold and silver, or silver, can be fused by the use of these fluxes so as to bring the whole charge to a perfect fluid state, to enable the gold and silver to precipitate to the bottom of the slag; but in the case of an antimonial, arsenical, or sulphureted ore the bases above mentioned must be thrown off previous to smelting, or the fluxes named must be so combined and mixed that they will be taken up in the slag. If lead is used to help precipitate the gold and silver it is separated by cupellation or some desilvering process. Ores are mixed at times to economize the use of fluxes, as it may be found, by an analysis of the ores, that they contain almost sufficient fusible material, with the addition of the combined fluxes, to successfully fuse and come to the fluid state desired. To one hundred pounds of quartz or other materials I add sixty pounds of alkali, fifteen pounds oxide of iron, ten pounds carbonate of lime or five pounds caustic lime, fifteen pounds of cryolite or thirty pounds of fluoride of calcium, five pounds of petroleum or naphtha earths, twenty pounds of niter, if wanted. I place a charge of from two hundred to five hundred pounds of the mixed mineral on the bed of a furnace, and, having closed the aperture through which the furnace is charged, submit the mixed minerals to the action of a white heat, and continue the operation until the charge is in a fluid state or the quartz is perfectly liquidated. I then examine the charge with tools to see if any particles of metal remain suspended in the slag; but if I find all the gold and silver has precipitated to the bottom of the furnace I draw off the slag from an upper tap-hole and recharge the furnace with the mixed minerals, at the same time replenishing the fire, keeping up the same amount of heat.

The slag of former melts or operations can be reused over again until they are too hard or full of silica or earthy matter.

When necessary to withdraw the metal I open a lower tap-hole at the bottom of the furnace and run off the gold and silver into molds.

These fluxes are designed to act generally in fusing and forming a perfectly liquid slag, and to combine and take up in the slag all base minerals that have a strong affinity to gold and silver.

In this my specification I have given the combined fluxes in as full and detailed a manner as I can; but it is a well-known fact that fluxes must be mixed with ores and other minerals, as the characteristics of the ore present themselves, as ascertained by analysis.

Having thus described my invention, what I claim is—

As a flux for smelting and liquidizing gold and silver ores, the described composition, consisting of natural alkali, iron oxide, caustic lime, cryolite, niter, and petroleum, substantially as set forth.

In witness whereof I have hereunto set my hand and seal.

CHAS. F. SECOR. [L. S.]

Witnesses:
GEO. H. STRONG,
OLWYN T. STACY.